June 27, 1961 R. A. BARKHUFF, JR., ET AL 2,989,782
METHOD FOR PREPARING MOLDED FOAMED RESIN ARTICLE
Filed July 5, 1956
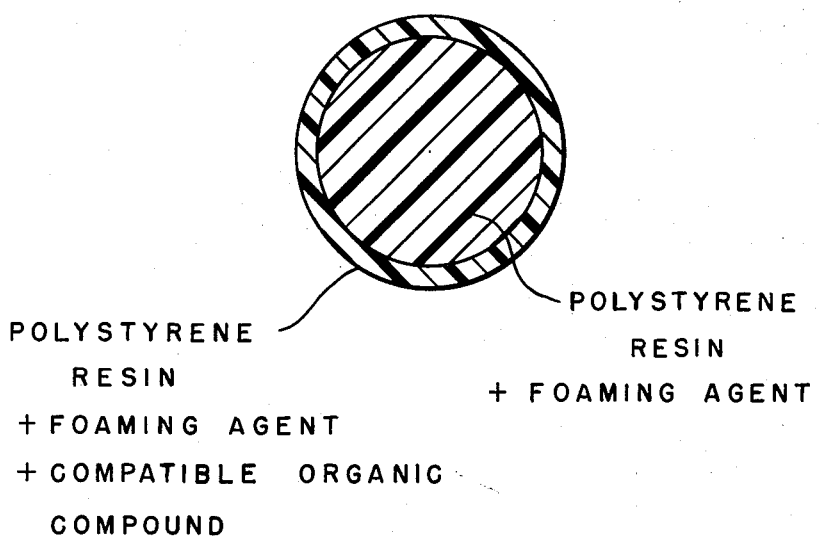
POLYSTYRENE RESIN
+ FOAMING AGENT
+ COMPATIBLE ORGANIC COMPOUND
POLYSTYRENE RESIN
+ FOAMING AGENT
RAYMOND A. BARKHUFF JR.
RALPH I. DUNLAP
NORBERT PLATZER  INVENTORS
BY *Richard L. Kelley*
ATTORNEY.

United States Patent Office 2,989,782
Patented June 27, 1961

2,989,782
METHOD FOR PREPARING MOLDED
FOAMED RESIN ARTICLE
Raymond A. Barkhuff, Jr., East Longmeadow, Ralph I. Dunlap, Longmeadow, and Norbert Platzer, Springfield, Mass., assignors to Monsanto Chemical Company, St. Louis, Mo., a corporation of Delaware
Filed July 5, 1956, Ser. No. 596,113
6 Claims. (Cl. 18—48)

The present invention relates to foamable thermoplastic resin particles. More particularly, the present invention relates to heterogeneous foamable particles of a vinylidene aromatic hydrocarbon resin in which the surface shell of the resin particles differs in chemical composition from the interior or core of the resin particles.

The vinylidene aromatic hydrocarbon resin foams and particularly polystyrene foams constitute a highly valuable class of resinous products. Such vinylidene aromatic hydrocarbon resin foams can be fabricated into diverse and complex shapes by heating small particles of the foamable resin composition in suitable molds. The heat foams the individual resin particles which fill the mold and knit together to form a unitary structure. Due to the intrinsically low thermal conductivity of the vinylidene aromatic hydrocarbon resins foams, such molded resin foam articles cool slowly. Consequently, when short molding cycles are employed, the molded resin foam articles are hot when removed from the molds. Unfortunately, the vinylidene aromatic hydrocarbon resin foams are weak at elevated temperatures and the removal of the molded resin foam articles from the molds before they have completely cooled often results in a high percentage of breakage of the molded articles. For obvious reasons, it would be highly desirable to have available to the art particulate foamable vinylidene aromatic hydrocarbon resins which would yield molded resin foam articles having improved strength at elevated temperatures.

It is an object of this invention to provide improved particulate foamable vinylidene aromatic hydrocarbon resin compositions.

Another object of this invention is to provide improved particulate foamable vinylidene aromatic hydrocarbon resin compositions which, when molded, yield molded resin foam articles having high strength at elevated temperatures.

Other objects and advantages of this invention will become apparent from the following detailed description thereof when read in conjunction with the attached drawing which illustrates schematically the nature of the particulate foamable vinylidene aromatic hydrocarbon resin compositions of this invention.

The present invention provides novel particulate foamable vinylidene aromatic hydrocarbon resin compositions which, when molded by conventional techniques, yield molded resin foam articles having high strength at elevated temperatures. The particulate foamable vinylidene aromatic hydrocarbon resin compositions comprise a particulate vinylidene aromatic hydrocarbon resin having incorporated therein as a foaming agent an organic compound which boils below the softening point thereof, the surface shell only of said resin particles containing a compatible organic compound that is soluble in the vinylidene aromatic hydrocarbon resin. The quantity of the compatible organic compound contained in the surface shell of the foamable resin particles is small and constitutes not more than about 2.0 weight percent of the total composition.

The following examples are set forth to illustrate more clearly the principle and practice of this invention to those skilled in the art. All parts are by weight.

EXAMPLE I

*Part A.*—Polystyrene of approximately 60,000 molecular weight is extruded into strands which are ground to a particle size of 8–20 mesh. The polystyrene particles are steeped in a large excess of n-pentane for 24 hours at 25° C., the entire mixture being constantly stirred to prevent agglomeration of the polymer particles. The polymer particles are recovered by filtration and placed in shallow open trays to evaporate the excess pentane from the particles. The final product contains approximately 7 weight percent pentane which is distributed substantially uniformly throughout the polymer particles.

*Part B.*—One thousand parts of the foamable polystyrene particles of Part A and 2.5 parts of tricresyl phosphate dissolved in 50 parts of methanol are charged to a sealed rotary blender which is rotated for 1 hour to uniformly coat the polymer particles with the tricresyl-phosphate-methanol solution. The resulting polymer particles are placed in shallow open trays to evaporate the methanol from the polymer particles. The resulting product contains 0.25% tricresyl phosphate, substantially all of said tricresyl phosphate being present on the surface of the foamable polystyrene polymer particles.

When molded polystyrene foam articles are prepared from the tricresyl phosphate coated foamable polystyrene particles and removed from the mold when still hot, it is observed that the molded resin foam articles have distinctly higher strengths than corresponding molded resin foam articles prepared from the corresponding foamable polystyrene particles of Part A of this example, but which contain no tricresyl phosphate on the surface of the polymer particles.

EXAMPLES II–XVII

Several heterogeneous foamable polystyrene polymer particles having chemically modified surface shells are prepared by incorporating a compatible organic compound into the surface shells of the polymer particles. In each case, 0.25 weight percent of the compatible organic compound is incorporated in the polymer particle surface shells by dry-blending the foamable polystyrene particles of EXAMPLE I, Part A, with a 5% solution of the compatible organic compound that is dissolved or dispersed in methanol. In the case of each example, it is observed that molded resin foam articles prepared from the surface modified polymer particles have higher strengths when hot than do molded articles prepared from the corresponding foamable polystyrene particles having no compatible organic compound in the surface shell thereof. The various compatible organic compounds incorporated in the surface of the polymer particles are set forth in Table I.

Table I

| Example | Compatible Organic Compound Incorporated In Particle Surface Shell |
|---|---|
| II | Triphenyl Phosphate. |
| III | Polyethylene Glycol (400 average molecular weight). |
| IV | Polypropylene Glycol (1800 average molecular weight). |
| V | Dibutyl Phthalate. |
| VI | Di(2-ethylhexyl)phthalate. |
| VII | Didecylphthalate. |
| VIII | Dinonyladipate. |
| IX | Dibutylsebacate. |
| X | Benzene. |
| XI | Xylene. |
| XII | Mineral Oil. |
| XIII | Ethylene Glycol Dilaurate. |
| XIV | Polychlorodiphenyl. |
| XV | Butylbenzylphthalate. |
| XVI | Trichlorobenzene. |
| XVII | Butyl Stearate. |

The compositions of this invention are heterogeneous particles of a foamable vinylidene aromatic hydrocarbon resin. The resin particles comprise a vinylidene aromatic hydrocarbon resin having dispersed substantially homogeneous therethrough as a foaming agent an organic compound which boils below the softening point thereof. The surface shells only of the resin particles contain a compatible organic compound that is soluble in the resin. The heterogeneous structure of the resin particles of this invention is illustrated in the attached drawing which is a cross-sectional view of a spherical foamable polystyrene particle of this invention. The core of the particle consists of a polystyrene resin having a foaming agent substantially homogeneously dispersed therethrough. The thin outer shell of the particle comprises the polystyrene resin, the foaming agent and the compatible organic compound.

The compatible organic compound included in the surface shell of the foamable vinylidene aromatic hydrocarbon resin particles will not exceed 2.0 weight percent of the total composition and preferably will constitute less than 1.0 weight percent and more especially less than about 0.5 weight percent of the total composition. The compatible organic compound should, however, constitute at least about 0.05 weight percent and preferably at least 0.1 weight percent of the total composition. It is important that the compatible organic compound be incorporated only in the surface shell of the foamable vinyline aromatic hydrocarbon resin particles. If the compatible organic compound is incorporated throughout the resin particles, it will have substantially less beneficial effect in improving the strength of molded resin foam articles at elevated temperatures and may also have a deleterious effect upon certain of the molded resin foam articles' physical properties, e.g. its softening temperature.

The resins included in the compositions of this invention are polymers of vinylidene aromatic hydrocarbons containing a single vinylidene group and a monocyclic aromatic ring. Typical examples of such vinylidene aromatic hydrocarbons include styrene, alpha-alkyl styrenes, e.g., alpha-methyl styrene, alpha-ethyl styrene, etc., ring-substituted alkyl styrenes such as o-, m-, and p-methyl styrene, o-, m-, and p-ethyl toluene, 2,4-dimethylstyrene, etc., ring-substituted halo styrenes such as o-, m-, and p-chloro-styrene, 2,4-dichlorostyrene, alpha-alkyl-ring-substituted alkyl styrenes, alpha-alkyl-ring-substituted halo styrenes, etc. The resins employed may be either homopolymers of the vinylidene aromatic hydrocarbons or interpolymers of the vinylidene aromatic hydrocarbons with themselves or other interpolymerizable vinylidene monomers such as the conjugated 1,3-dienes, e.g., butadiene, isoprene, etc., alpha, beta-unsaturated monocarboxylic acids and derivatives thereof, e.g., acrylic acid, methyl acrylate, ethyl acrylate, butyl acrylate, 2-ethylhexyl acrylate, and the corresponding esters of methacrylic acid, acrylamide, methacrylamide, acrylonitrile, methacrylonitrile, etc. Where interpolymers are employed, the vinylidene aromatic hydrocarbon should constitute more than 50 weight percent of the interpolymer and more especially more than about 70 weight percent of the interpolymer. If desired, blends of the vinylidene aromatic hydrocarbon resin with other polymers may be employed, e.g. blends of the vinylidene aromatic hydrocarbon resins with rubbery diene polymers, or the analogous compositions obtained by dissolving a rubbery diene polymer in the vinylidene aromatic hydrocarbon monomer and subsequently polymerizing the mixture. Where polystyrene is the resin employed, it will preferably have a molecular weight in the range of 40,000–80,000 (as determined by the Staudinger method).

The foaming agent included in the composition of the invention may be any organic compound which boils below the softening point of the vinylidene aromatic hydrocarbon resin and which can be incorporated substantially homogeneously therethrough. Preferably, although not mandatorily, the foaming agent employed should have little or no solvent action on the vinylidene aromatic hydrocarbon resin. Suitable examples of such foaming agents include acetone, methyl alcohol, methyl acetate, ethyl acetate, methyl formate, ethyl formate, dichloroethylene, isopropyl chloride, propionaldehyde and dipropyl ether. Other examples of suitable foaming agents include methyl chloride, dichloroethane, dichlorodifluoromethane and other low-boiling chlorofluoroalkanes. An especially preferred class of foaming agents consists of aliphatic hydrocarbons boiling within the range of 10° C. to 80° C. such as pentane, hexane, heptane, cyclopentane, cyclopentadiene, and petroleum ethers boiling within the indicated temperature range. If desired, mixtures of two or more foaming agents may be employed.

The organic compound included in the surface shell of the foamable vinylidene aromatic hydrocarbon resin particles may be any organic compound which is compatible with the resin and which can be dissolved or absorbed therein. For the purposes of this invention, an organic compound is considered to be compatible with the vinylidene aromatic hydrocarbon resin if 10 parts of the organic compound can be milled into 100 parts of the resin and retained in a 50 mil sheet for 24 hours without exudation when stored at 25° C. While any such compatible organic compound may be employed, it is preferred to employ compatible organic compounds having relatively high vapor pressures, e.g., those compounds whose atmospheric boiling points are above 100° C. and more especially above 150° C. Typical examples of the compatible organic compounds that may be employed include the following:

Aromatic Hydrocarbons:
    Benzene
    Toluene
    Xylene
    Ethylbenzene
    Cumene
    Diethylbenzene
Polyalkylene Glycols:
    Polyethylene Glycols
    Polypropylene Glycols
    Mixed Heteric Polyethylene Polypropylene Glycols, cf. 2,425,755
    Alkyl Ethers of Polypropylene Glycols
Chlorinated Hydrocarbons:
    Chlorobenzene
    Dichlorobenzene
    Bromobenzene
    Trichlorobenzene
    Polychlorodiphenyl
    Polychlorotriphenyl
Miscellaneous Hydrocarbons:
    Terpentine
    Pinene
    Mineral Oil, e.g., Nujol
    Aromatic Naphthas
Fatty Acids and Esters Thereof:
    Linseed Oil
    Monoglycerides of 12 to 20 Carbon Atom Fatty Acids
    Ethyl Oleate
    Butyl Stearate
    Lauric Acid
    Stearic Acid
    Turkey Red Oil
    Whale Oil
    Castor Oil
Phosphoric Acid Esters:
    Triethyl Phosphate
    Monobutyl-Diethyl Phosphate
    Triphenyl Phosphate
    Tricresyl Phosphate
    Mixed Phenyl-Cresyl Phosphates Alkyl Esters of Polycarboxylic Acids:
- Dimethyl Phthalate
- Dibutyl Phthalate
- Butylbenzyl Phthalate
- Di(2-ethylhexyl) Phthalate
- Diphenyl Phthalate
- Diisodecyl Phthalate
- Dibutyl Adipate
- Dibutyl Sebacate
- Dioctyl Adipate The compatible organic compound may be incorporated into the surface shell of the vinyl aromatic hydrocarbon resin particles by numerous techniques. As illustrated in the examples herein presented, the compatible organic compound may be incorporated into the surface shell of the resin particles by dry-blending the foamable resin particles with the compatible organic compound that is dissolved or dispersed in an organic liquid which has essentially no solvent action on the resin particles. The organic liquid which serves as a carrier for the compatible organic compound is subsequently evaporated from the treated resin particles. In an alternate procedure, the foamable vinylidene aromatic hydrocarbon resin particles may be suspended in an air stream, i.e. fluidized, in which a suitable small quantity of the compatible organic compound is vaporized.

While throughout the foregoing discussion of the invention it is stated that the compatible organic compound is incorporated in the surface shell of the resin particles, it is recognized that under some conditions the compatible organic compound may be absorbed upon the particle surface and not actually dissolved or dispersed in the resin. In particular, this condition may occur when the resin particles are dry-blended with a compatible organic compound that is a solid at the blending temperature. When such coated resin particles stand for a sufficient period of time, or are heated, during the molding cycle if not sooner, the solid compatible organic compound dissolves or disperses in the surface shell of the resin particles. Such coated particulate foamable vinylidene aromatic hydrocarbon resins are included within the scope of the appended claims.

The above descriptions and particularly the examples are set forth by way of illustration only. Many other variations and modifications thereof will be apparent to those skilled in the art and can be made without departing from the spirit and scope of the invention herein set forth.

What is claimed is.

1. In the method for preparing molded foamed resin articles in which particulate foamable styrene polymer particles having incorporated therein, as a foaming agent, an aliphatic hydrocarbon boiling within the range of 10–80° C. are placed in a mold and then heated to a temperature at which the resin particles foam, fill the mold and knit together to form a unitary structure; the improvement which comprises incorporating in the surface shell only of said foamable styrene polymer particles a minor amount of a compatible organic compound which has an atmospheric boiling point above 100° C. and is soluble in the styrene polymer, said compatible organic compound constituting less than about 2.0 weight percent of the total composition.

2. The method of claim 1 in which the compatible organic compound is a triaryl ester of phosphoric acid.

3. The method of claim 1 in which the compatible organic compound is a polyalkyl ester of a polybasic organic acid.

4. The method of claim 1 in which the compatible organic compound is a polychlorinated diphenyl.

5. The method of claim 1 in which the compatible organic compound is an aromatic hydrocarbon.

6. The method of claim 1 in which the compatible organic compound is an alkyl ester of a fatty acid containing at least 12 carbon atoms in its structure.

References Cited in the file of this patent

UNITED STATES PATENTS

| | | |
|---|---|---|
| 2,357,833 | Kropscott et al. | Sept. 12, 1944 |
| 2,358,963 | Davies | Sept. 26, 1944 |
| 2,533,629 | Rosenthal | Dec. 12, 1950 |
| 2,537,977 | Dulmage | Jan. 16, 1951 |
| 2,683,696 | Muller | July 13, 1954 |
| 2,714,076 | Seckel | July 26, 1955 |
| 2,787,809 | Stastiny | Apr. 9, 1957 |
| 2,797,443 | Carlson | July 2, 1957 |
| 2,801,936 | Bjorksten | Aug. 6, 1957 |
| 2,806,255 | Dietz | Sept. 17, 1957 |
| 2,819,232 | Fortune | Jan. 7, 1958 |
| 2,839,422 | Beyer et al. | June 17, 1958 |
| 2,857,340 | Colwell | Oct. 21, 1958 |